(12) United States Patent
Abe et al.

(10) Patent No.: US 9,698,450 B2
(45) Date of Patent: Jul. 4, 2017

(54) METHOD FOR PRODUCING A NON-AQUEOUS SECONDARY BATTERY

(71) Applicant: TOYOTA JIDOSHA KABUSHIKI KAISHA, Toyota-shi, Aichi (JP)

(72) Inventors: Takeshi Abe, Toyota (JP); Toshiyuki Kawai, Toyota (JP); Shinichi Kinoshita, Ibaraki (JP); Takamichi Mitsui, Ibaraki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 422 days.

(21) Appl. No.: 14/401,641

(22) PCT Filed: Apr. 30, 2013

(86) PCT No.: PCT/JP2013/002890
§ 371 (c)(1),
(2) Date: Nov. 17, 2014

(87) PCT Pub. No.: WO2013/171991
PCT Pub. Date: Nov. 21, 2013

(65) Prior Publication Data
US 2015/0140361 A1    May 21, 2015

(30) Foreign Application Priority Data
May 18, 2012    (JP) .................. 2012-114642

(51) Int. Cl.
*H01M 10/42* (2006.01)
*H01M 4/04* (2006.01)
*H01M 10/0567* (2010.01)

(52) U.S. Cl.
CPC ..... *H01M 10/4242* (2013.01); *H01M 4/0445* (2013.01); *H01M 10/0567* (2013.01);
(Continued)

(58) Field of Classification Search
CPC .................. H01M 4/0445; H01M 10/4242
(Continued)

(56) References Cited

U.S. PATENT DOCUMENTS

2007/0281212 A1    12/2007  Thackeray et al.
2008/0026297 A1    1/2008   Chen et al.
(Continued)

FOREIGN PATENT DOCUMENTS

CN    101373849 A    2/2009
JP    2002-42814     2/2002
(Continued)

*Primary Examiner* — Basia Ridley
*Assistant Examiner* — James Erwin
(74) *Attorney, Agent, or Firm* — Finnegan, Henderson, Farabow, Garrett & Dunner, LLP

(57) ABSTRACT

A non-aqueous secondary battery production method is provided. The method comprises constructing a preconditioning cell that comprises a positive electrode comprising a positive electrode active material, a preconditioning electrolyte solution comprising a supporting salt and a fluorine-containing non-ionic compound, and a preconditioning negative electrode (step S110); of carrying out a preconditioning process by charging the preconditioning cell and allowing the fluorine-containing non-ionic compound to be decomposed at the positive electrode to form coatings on surfaces of the positive electrode active material (step S120); and of constructing a non-aqueous secondary battery, using the coated positive electrode active material, a non-aqueous electrolyte solution different from the preconditioning electrolyte solution, and a negative electrode comprising a negative electrode active material (step S130).

10 Claims, 3 Drawing Sheets

(52) U.S. Cl.
CPC ... *H01M 10/4235* (2013.01); *H01M 10/4257* (2013.01); *H01M 2010/4271* (2013.01); *Y10T 29/49108* (2015.01)

(58) Field of Classification Search
USPC .......................................................... 429/7
See application file for complete search history.

(56) References Cited

U.S. PATENT DOCUMENTS

2009/0325041 A1* 12/2009 Okumura ................ H01M 2/34
 429/61
2012/0321965 A1 12/2012 Fujikawa et al.

FOREIGN PATENT DOCUMENTS

JP  2010-245017  10/2010
WO  WO 2011/105002 A1  9/2011

\* cited by examiner

METHOD FOR PRODUCING A NON-AQUEOUS SECONDARY BATTERY

The present application claims priority based on Japanese Patent Application No. 2012-114642 filed on May 18, 2012, and the entire contents thereof are incorporated herein by reference.

TECHNICAL FIELD

The present invention relates to a non-aqueous secondary battery and a method for producing the same.

BACKGROUND ART

In efforts to increase performance of secondary batteries, higher energy densities are expected therefrom. A higher energy density can be obtained, for instance, by increasing the operating voltage of a battery (by increasing the battery voltage). For example, Japanese Patent Application Publication No. 2002-042814 (PLT 1) discloses a non-aqueous secondary battery using a positive electrode active material consisting of a spinel lithium nickel manganese composite oxide represented by a prescribed general formula as a non-aqueous secondary battery that exhibits an operating voltage of 4.5 V or above versus lithium metal.

CITATION LIST

Patent Literature

PTL 1: Japanese Patent Application Publication No. 2002-042814

SUMMARY OF INVENTION

In a battery having a high operating voltage, however, the potential of the positive electrode increases when being charged, and the electrolyte solution is likely to undergo oxidative decomposition at the positive electrode. In order to prevent such oxidative decomposition, as an electrolyte component, use of a material having higher oxidation resistance (having a higher oxidative decomposition potential) has been researched. However, in general, because the oxidation resistance and the reduction resistance of a substance are two opposing properties, when one is increased, the other will decrease. In other words, an electrolyte component with high oxidation resistance has a tendency to undergo reductive decomposition at the negative electrode when being charged. Such decomposition of an electrolyte component can cause degradation of secondary battery performance. For instance, it may cause the capacity to decline with increasing number of charge/discharge cycles applied.

One objective of the present invention is to provide a method for producing a non-aqueous secondary battery that is less likely to degrade with repeated charge and discharge (in other words, a non-aqueous secondary battery having excellent cycling properties). Another related objective is to provide a non-aqueous secondary battery obtainable by such a production method as well as a power-supply unit using the non-aqueous secondary battery.

The present inventors have discovered that the problem can be solved and completed the present invention by pre-forming on surfaces of a positive electrode active material coatings capable of suppressing the reactivity toward electrolyte components and constructing a non-aqueous secondary battery using the coated positive electrode active material.

The non-aqueous secondary battery production method provided by the present invention comprises constructing a preconditioning cell. The preconditioning cell comprises a positive electrode comprising a positive electrode active material, a preconditioning electrolyte solution comprising a supporting salt and a fluorine (F)-containing non-ionic compound, and a preconditioning negative electrode. The method further comprises carrying out a preconditioning process by charging the preconditioning cell and allowing the F-containing non-ionic compound to be decomposed at the positive electrode to form coatings on surfaces of the positive electrode active material. The preconditioning process can be understood as a process to produce the coated positive electrode active material. The method may further comprise constructing a non-aqueous secondary battery, using the coated positive electrode active material, a non-aqueous electrolyte solution different from the preconditioning electrolyte solution, and a negative electrode comprising a negative electrode active material. Hereinafter, to prevent confusion with the preconditioning electrolyte solution, the non-aqueous electrolyte solution used for constructing a non-aqueous secondary battery may be referred to as a "battery electrolyte solution".

In such a method, a preconditioning process is carried out, where the F-containing non-ionic compound contained in the preconditioning electrolyte solution is allowed to be decomposed to form coatings on surfaces of the positive electrode active material; and a non-aqueous secondary battery is fabricated with the coated positive electrode active material. Since the preconditioned positive electrode active material has the coatings, its activity toward decomposition of electrolyte components is suppressed. Thus, even though the non-aqueous secondary battery has a constitution comprising a battery electrolyte solution with relatively low oxidation resistance, the electrolyte solution is less susceptible to oxidative decomposition at the positive electrode. For instance, even with a constitution comprising a battery electrolyte solution having an oxidation potential lower than that of the preconditioning electrolyte solution, the battery electrolyte solution is less susceptible to oxidative decomposition at the positive electrode. In general, an electrolyte solution with low oxidation resistance tends to exhibit good reduction resistance. Thus, according to the method described above, can be obtained a non-aqueous secondary battery in which oxidative decomposition at the positive electrode and reductive decomposition at the negative electrode are both suppressed. A non-aqueous secondary battery in which decomposition of electrolyte components are suppressed to a great extent may have excellent cycling properties. For example, the battery capacity may be less likely to decline with repeated charge and discharge.

As used herein, "secondary battery" refers to an electric storage device in general that can be charged and discharged repeatedly, and the scope of the term encompasses so-called storage batteries such as lithium secondary batteries and the like as well as electric storage elements such as electric double layer capacitors and the like.

"Non-aqueous secondary battery" refers to a battery comprising a non-aqueous electrolyte solution. The non-aqueous electrolyte solution typically contains a supporting salt (supporting electrolyte) in a non-aqueous solvent.

As used herein, "lithium secondary battery" refers to a secondary battery using lithium ions as electrolyte ions where charging and discharging are mediated by lithium ions transported between the positive and negative electrodes. Secondary batteries generally called as lithium-ion secondary batteries are typical examples included in the scope of the lithium secondary battery disclosed herein.

As used herein, "active material" refers to a substance capable of reversely storing and releasing (typically capable of effecting intercalation and deintercalation of) chemical species (e.g., lithium ions in lithium secondary batteries) that work as charge carriers in secondary batteries.

As used herein, "lithium transition metal compound" refers to a compound containing lithium and at least one species of transition metal.

As used herein, "F-containing non-ionic compound" refers to a non-ionic compound (typically a non-ionic organic compound) comprising a fluorine atom. The "non-ionic compound" refers to a compound free of any functional group among acidic groups (carboxyl group, phosphate group, sulfonate group, etc.) and basic groups (amino group, etc.). The F-containing non-ionic compound contained in the preconditioning electrolyte solution may be a fluorination product of a F-free non-ionic organic compound known to be usable as a component in electrolyte solutions of non-aqueous secondary batteries. Examples of the F-free non-ionic organic compound include non-aqueous solvents (typically aprotic solvents) that are known to be usable as components in electrolyte solutions of non-aqueous secondary batteries and are free of fluorine atoms. The fluorination product of a F-free non-ionic organic compound refers to a compound having a chemical structure in which at least one hydrogen atom of the said F-free non-ionic organic compound is substituted with a fluorine atom. For example, it can be a fluorinated non-aqueous solvent.

As the F-containing non-ionic compound contained in the preconditioning electrolyte solution, can be preferably used one, two or more species of F-containing carbonate. Herein, "carbonate" refers to an organic compound having at least one carbonate group (—O—(C=O)—O—) in the molecule, and the scope of the term encompasses both cyclic carbonates and acyclic (chain) carbonates. As used herein, the term "chain" means both a straight chain and a branched chain unless otherwise specified. According to a preconditioning electrolyte solution having such a composition, surfaces of a positive electrode active material can be provided with coatings that prevent decomposition of electrolyte components to a greater extent. Thus, can be obtained a non-aqueous secondary battery having even greater cycling properties.

In a preferable embodiment, the preconditioning electrolyte solution comprises at least one species of F-containing cyclic carbonate as the F-containing non-ionic compound. Preferable examples of such a preconditioning electrolyte solution include preconditioning electrolyte solutions containing one or each of trans-difluoroethylene carbonate (or trans-4,5-difluoro-1,3-dioxolane-2-one, or "trans-DFEC" hereinafter) and mono-fluoroethylene carbonate (or "MFDC" hereinafter). According to a preconditioning electrolyte solution having such a composition, surfaces of a positive electrode active material can be provided with coatings that prevents decomposition of electrolyte components to a greater extent. Thus, can be obtained a non-aqueous secondary battery having even greater cycling properties.

On the other hand, the non-aqueous electrolyte solution (battery electrolyte solution) used for constructing a non-aqueous secondary battery typically comprises a supporting salt and a non-aqueous solvent. The non-aqueous solvent (typically an aprotic solvent) may have a composition essentially free of fluorinated non-aqueous solvents. For instance, it may be a non-aqueous solvent consisting essentially of F-free non-ionic compound(s). Examples of a preferable embodiment of the art disclosed herein include an embodiment where the battery electrolyte solution is essentially free of a fluorinated carbonate (which can be understood as a F-containing carbonate) as the non-aqueous solvent. In general, upon fluorination, the oxidation resistance tends to increase in an organic compound constituting a non-aqueous solvent while the reduction resistance is reduced. Thus, can be obtained a non-aqueous secondary battery in which oxidative decomposition is prevented at the positive electrode with use of the preconditioned positive electrode active material while both oxidative and reductive decomposition of the battery electrolyte solution are greatly suppressed with use of a battery electrolyte solution essentially free of a fluorinated non-aqueous solvent coupled with the preconditioned positive electrode active material. Such a non-aqueous secondary battery may have even greater cycling properties.

The preconditioning process can be carried out preferably in an embodiment where the F-containing non-ionic compound is allowed to be decomposed while the positive electrode is at a potential above 4.3 V vs. lithium metal (or "vs. Li/Li$^+$" hereinafter). In other words, it is preferable that the preconditioning cell is charged until the potential of the positive electrode reaches above 4.3 V (vs. Li/Li$^+$). The F-containing non-ionic compound (when several different species of F-containing non-ionic compound are contained in the preconditioning electrolyte solution, at least one species among them) preferably has an oxidative decomposition potential above 4.3 V (vs. Li/Li$^+$). According to such an embodiment, surfaces of a positive electrode active material can be provided with coatings that prevent decomposition of electrolyte components to a greater extent. In other words, can be obtained a preconditioned positive electrode active material with greater ability to prevent decomposition of electrolyte components. Thus, according to this embodiment, can be obtained a non-aqueous secondary battery having even greater cycling properties. Better results can be obtained by allowing the F-containing non-ionic compound to be decomposed while keeping the positive electrode at a potential of, for instance, 4.5 V or above (vs. Li/Li$^+$).

The art disclosed herein can be preferably applied to production of a non-aqueous secondary battery (e.g., a lithium-ion secondary battery) in which the positive electrode operates at a potential above 4.3 V (vs. Li/Li$^+$) (more preferably 4.5 V or above vs. Li/Li$^+$). Herein, a "non-aqueous secondary battery in which the positive electrode operates at a potential above 4.3 V (vs. Li/Li$^+$)" refers to a non-aqueous secondary battery in which the positive electrode active material has a redox potential (an operating potential) above 4.3 V (vs. Li/Li$^+$) over a certain SOC (state of charge; charge level) range (over a segment of the full SOC range of 0% to 100%). Such a battery can be seen as a non-aqueous secondary battery that exhibits a positive electrode potential above 4.3 V (vs. Li/Li$^+$) at least over a certain SOC range. Preferable examples of a positive electrode active material that can operate at a potential above 4.3 V over a certain SOC range include spinel lithium nickel manganese oxides (e.g., $LiNi_{0.5}Mn_{1.5}O_4$). According to a positive electrode active material having such a high operating potential, can be obtained a non-aqueous secondary battery having a higher voltage across the two electrodes (i.e., a high voltage non-aqueous secondary battery). Furthermore, because electrolyte components are more susceptible to oxidative decomposition on a positive electrode at such a high potential, it is especially meaningful to use a positive electrode active material with increased ability to prevent decomposition of electrolyte components.

In another aspect, the art disclosed herein provides a non-aqueous secondary battery comprising the coated positive electrode active material. The non-aqueous secondary battery comprises the coated positive electrode active material, a non-aqueous electrolyte solution (battery electrolyte solution), and a negative electrode comprising a negative electrode active material. The battery electrolyte solution typically comprises a supporting salt and a non-aqueous solvent. In a preferable embodiment, the non-aqueous solvent consists essentially of F-free non-ionic compound(s). In such a non-aqueous secondary battery, both oxidative and reductive decomposition of the battery electrolyte solution may be greatly suppressed. According to such a non-aqueous secondary battery, excellent cycling properties can be obtained.

In another aspect, the art disclosed herein provides a power-supply unit comprising any of the non-aqueous secondary battery disclosed herein (which can be a non-aqueous secondary battery produced by applying any of the method disclosed herein) and a control circuit electrically connected to the battery. The control circuit is able to regulate at least the upper voltage limit of the non-aqueous secondary battery when the power-supply unit is put to use. In a preferable embodiment, the upper voltage limit is set at a value that accepts a positive electrode potential above 4.3 V (vs. Li/Li$^+$) in the battery (e.g., a value that allows the positive electrode potential to be at 4.5 V or above (vs. Li/Li$^+$)). Since the non-aqueous secondary battery comprises a positive electrode active material (coated positive electrode active material) less active toward decomposition of electrolyte components, it may produce excellent cycling properties even under a condition of use where the positive electrode potential may become as high as described above. It is advantageous that it can be stably used under such a condition from the standpoint of making a battery with a higher energy density (higher voltage).

The non-aqueous secondary battery (e.g., a lithium-ion secondary battery) disclosed herein may have excellent cycling properties as described above. For example, the capacity may not decline significantly with repeated charge and discharge. Taking advantage of such characteristics, the non-aqueous secondary battery disclosed herein can be preferably used as a power-supply (driving power source) of, for instance, a hybrid vehicle or an electric vehicle. Thus, in another aspect, the present invention provides, for instance, as shown in FIG. 5, a vehicle 1 comprising a non-aqueous secondary battery 100 disclosed herein preferably as a power supply. The vehicle 1 may comprise a plurality of non-aqueous secondary batteries 100, typically in a battery unit where these batteries are connected in series. Typical examples of the hybrid vehicle include vehicles comprising both an engine (internal combustion system) and a motor-driving battery as its power supplies.

DESCRIPTION OF EMBODIMENTS

Figure 1:
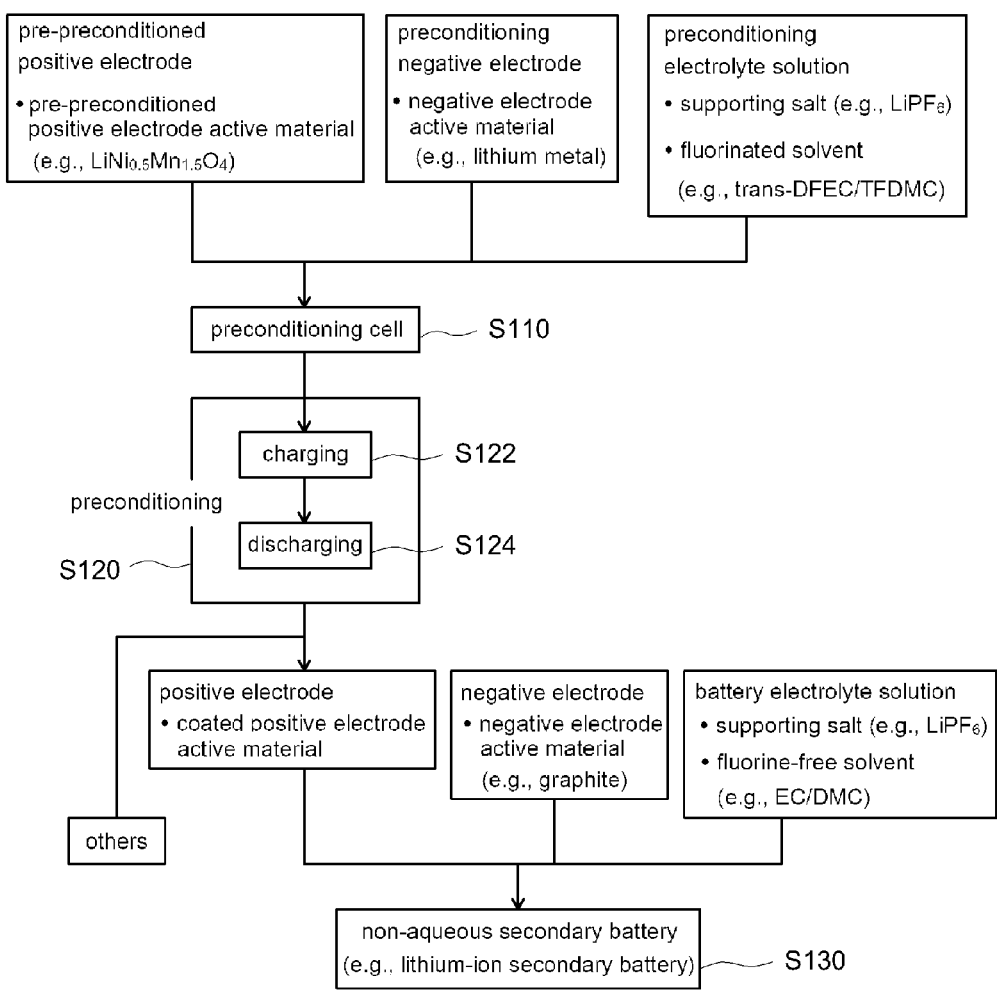
FIG. 1 shows a flow chart of a non-aqueous secondary battery production method according to an embodiment.

Preferred embodiments of the present invention are described below. Matters necessary to practice this invention other than those specifically referred to in this description may be understood as design matters based on the conventional art in the pertinent field to a person of ordinary skills in the art. The present invention can be practiced based on the contents disclosed herein and common technical knowledge in the subject field. In the drawings referred to below, a common reference numeral may be assigned to members or sites producing the same effects, and redundant descriptions may be omitted or simplified. Moreover, the dimensional relationships (of length, width, thickness, etc.) in the respective drawings do not necessarily represent actual dimensional relationships.

The present invention is described below in detail, while referencing, as a main example, to a lithium-ion secondary battery in an embodiment in which an electrode body comprising a positive electrode and a negative electrode is placed along with a non-aqueous electrolyte solution in a square battery case although the application of the present invention is not limited to a non-aqueous secondary battery having such a shape. In other words, the shape of the non-aqueous secondary battery according to the present invention is not particularly limited, and the materials, shapes, sizes, etc., of the battery case, electrode body, etc., can be suitably selected in accordance with its intended use and capacity. For example, the battery case may have a cubic, flattened, cylindrical, or other shape.

<Lithium-Ion Secondary Battery>

Figure 2:
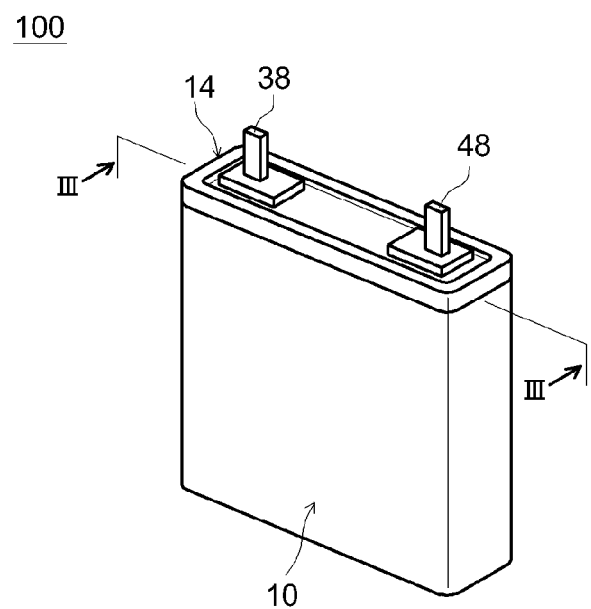
FIG. 2 shows a perspective view schematically illustrating the external form of a non-aqueous secondary battery according to an embodiment.
Figure 3:
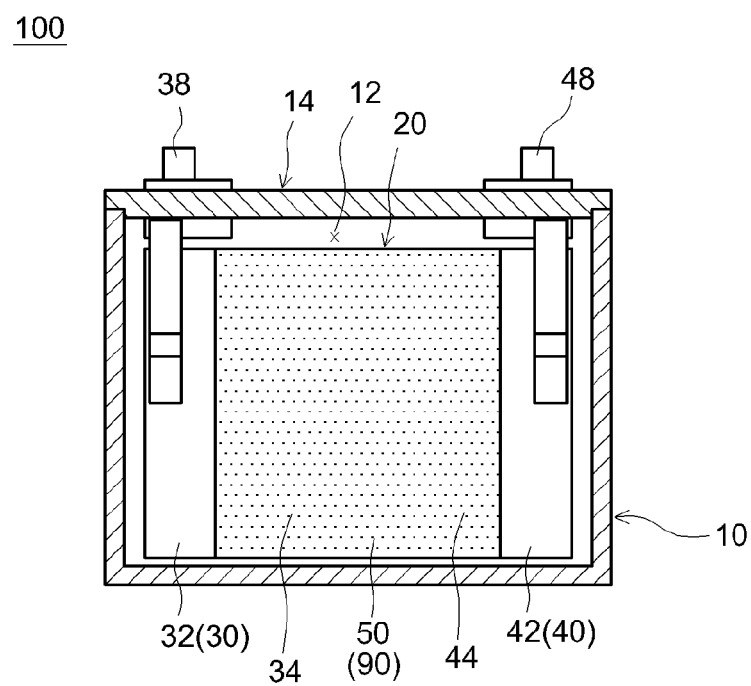
FIG. 3 shows a cross-sectional view taken along line III-III in FIG. 2.

A lithium-ion secondary battery according to an embodiment of the art disclosed herein has, as shown in FIG. 2 and FIG. 3 for example, a constitution where wound electrode body 20 is placed along with non-aqueous electrolyte solution 90 in flat box-shaped battery case 10 corresponding to the shape of electrode body 20. Opening 12 of case 10 is closed with lid 14. Lid 14 has positive terminal 38 and negative terminal 48 for connection to the outside, with the terminals partially extending out from the surface of lid 14. Lithium-ion secondary battery 100 having such a constitution can be constructed by, for instance, placing electrode body 20 via opening 12 into case 10, putting lid 14 over opening 12 of case 10 followed by injecting non-aqueous electrolyte solution (battery electrolyte solution) 90 via a hole (not shown in the drawing) for electrolyte solution injection in lid 14, and subsequently closing the hole.

Electrode body 20 shown in FIG. 3 has a flattened shape formed by overlaying and winding up positive electrode sheet 30 and negative electrode sheet 40, and laterally compressing the resulting wound body. In typical, between positive electrode sheet 30 and negative electrode sheet 40, an insulating layer is present to prevent direct contacts between the two. In a preferable embodiment, two sheets of separator 50 are used as the insulating layers. For example, these separator sheets 50 are wound up along with positive electrode sheet 30 and negative electrode sheet 40 to form electrode body 20.

Positive electrode sheet 30 is formed with partially exposed positive current collector 32 on one edge along the length direction, where positive electrode active material layer 34 is not provided. Similarly, negative electrode sheet 40 is formed with partially exposed negative current collector 42 on one edge along the length direction, where negative electrode active material layer 44 is not provided. Positive terminal 38 is joined to the exposed edge of positive current collector 32 and negative terminal 48 is joined to the exposed edge of negative current collector 42, respectively. Positive and negative terminals 38 and 48 can be joined to positive and negative current collectors 32 and 42, for example, by ultrasonic welding, resistance welding, and so on.

<Positive Electrode Sheet>

Positive electrode sheet 30 shown in FIG. 3 has a constitution where positive electrode active material layer 34 comprising a positive electrode active material is retained on a long sheet of positive current collector 32. As the positive electrode active material, among various materials known to be usable as positive electrode active materials in lithium-ion secondary batteries, can be used one, two or more species without particular limitations. Examples include lithium transition metal compounds with having a layered structure or a spinel structure, etc., and containing lithium and at least one species of transition metal as metal components; polyanionic (e.g., olivine-type) lithium transition metal compounds; and the like. More specifically, for instance, the following compounds can be used.

(1) A lithium transition metal compound (oxide) represented by a general formula $LiMn_{2-x}M_xO_4$ (A1), which typically has a spinel structure. Here, x is zero or more but less than 2 and typically zero or more but 1 or less. When x is greater than zero, M may be a metal other than Mn, or a non-metal. In a preferable embodiment, M comprises at least one species of transition metal. Specific examples include $LiNi_{0.5}Mn_{1.5}O_4$, $LiCrMnO_4$, and the like.

Examples of a preferable positive electrode active material include compounds containing at least Ni as M in the general formula (A1), such as spinel lithium transition metal oxides represented by a general formula $LiNi_pM^1_qMn_{2-p-q}O_4$ (A2). Here, p is more than zero, q is zero or more, and p+q is less than 2 (typically, p+q is 1 or less). In a preferable embodiment, q is zero, and p is 0.2 or more but 0.6 or less. When q is greater than zero, $M^1$ may be a metal (e.g., one, two or more species selected from Fe, Co, Cu, Cr, Zn and Al) other than Ni and Mn, or a non-metal. $M^1$ preferably comprises at least one of Fe(III) and Co. Furthermore, q is preferably more than zero but 0.3 or less, and 2p+q is preferably 1 or more.

(2) A lithium transition metal compound (oxide) represented by a general formula $LiMO_2$, which typically has a layered structure. Here, M comprises at least one species among transition metals such as Ni, Co, Mn, and the like, and may further comprise another metal or a non-metal. Specific examples include $LiNiO_2$, $LiNi_{1/3}Co_{1/3}Mn_{1/3}O_2$, and the like.

(3) A lithium transition metal compound (oxide) represented by a general formula $Li_2MO_3$. Here, M comprises at least one species among transition metals such as Mn, Fe, Co, and the like, and may further comprise another metal or a non-metal. Specific examples include $Li_2MnO_3$, $Li_2PtO_3$ and the like.

(4) A lithium transition metal compound (phosphate salt) represented by a general formula $LiMPO_4$. Here, M comprises at least one species among transition metals such as Mn, Fe, Ni, Co, and the like, and may further comprise another metal or a non-metal. Specific examples include $LiMnPO_4$, $LiFePO_4$, and the like.

(5) A lithium transition metal compound (phosphate salt) represented by a general formula $Li_2MPO_4F$. Here, M comprises at least one species among transition metals such as Mn, Ni, Co and the like, and may further comprise another metal or a non-metal. Specific examples include $LiMnPO_4F$ and the like.

(6) A solid solution of $LiMO_2$ and $Li_2MO_3$. Here, $LiMO_2$ accords with the general formula given in (2) above while $Li_2MO_3$ accords with the general formula given in (3) above. Specific examples include a solid solution represented by $0.5LiNiMnCoO_2$-$0.5Li_2MnO_3$.

In a preferable embodiment, the positive electrode active material has an operating potential (vs. Li/Li$^+$) above that of a general lithium-ion secondary battery (with an operating potential limited up to about 4.1 V to 4.2 V) at least over a certain SOC range. For example, a preferable positive electrode active material has an operating potential above 4.3 V (vs. Li/Li$^+$). In other words, can be used preferably a positive electrode active material with the maximum operating potential in the full SOC range of 0% to 100% being above 4.3 V (vs. Li/Li$^+$). With use of such a positive electrode active material, can be obtained a lithium-ion secondary battery in which the positive electrode operates at a potential above 4.3 V (vs. Li/Li$^+$). Preferable examples of such a positive electrode active material include $LiNi_PMn_{2-P}O_4$ (here, P is 0.2 or more but 0.6 or less; e.g., $LiNi_{0.5}Mn_{1.5}O_4$), $LiNiPO_4$, $LiCoPO_4$, $0.5LiNiMnCoO_2$-$0.5Li_2MnO_3$, and the like. A more preferable positive electrode active material has an operating potential (vs. Li/Li$^+$) of 4.5 V or above (or even 4.6 V or above, e.g., 4.7 V or above).

Herein, the operating potential of a positive electrode active material can be determined as follows. In particular, a three-electrode cell is constructed with a positive electrode comprising a positive electrode active material to be measured, a lithium metal piece as a counter electrode, another lithium metal piece as a reference electrode, and an electrolyte solution containing $LiPF_6$ at a 1 M concentration in a mixed solvent consisting of EC and DMC (30:70 by volume). Based on the theoretical capacity of the cell, the SOC value of the cell is changed by a 5% increment from 0% SOC to 100% SOC. For instance, the SOC value is adjusted by charging the cell at a constant current rate. The cell adjusted to each SOC value is left for one hour and then subjected to a measurement of positive electrode potential. The measured positive electrode potential (vs. Li/Li$^+$) is recorded as the operating potential of the positive electrode active material at this SOC value.

In general, the operating potential of a positive electrode active material is maximized over a SOC range that includes 100% SOC. Thus, the maximum operating potential of the positive electrode active material (e.g., whether or not it is above 4.3 V) can be usually assessed based on the operating potential of the positive electrode active material at 100% SOC (i.e., when fully charged). The operating potential (vs. Li/Li$^+$) of the positive electrode active material at 100% SOC is preferably above 4.4 V, or more preferably 4.5 V or above. In typical, the art disclosed herein can be preferably applied to a lithium-ion secondary battery comprising a positive electrode active material that has an operating potential (vs. Li/Li$^+$) of 7.0 V or below (typically 6.0 V or below, e.g., 5.5 V or below) at 100% SOC.

In usual, the positive electrode active material is preferably present as particles having an average particle diameter of about 1 micron to 20 microns (e.g., 2 microns to 10 microns). As used herein, "average particle diameter" refers to a volume average particle diameter, that is, a particle diameter at 50% cumulative volume in a size distribution measured using a particle counter based on the laser scattering/diffraction theory unless otherwise specified. Hereinafter, a volume average particle diameter may be abbreviated to "$D_{50}$". The average particle diameter range shown above can be preferably applied to a positive electrode active material prior to the preconditioning process (i.e., pre-preconditioned positive electrode active material). It is preferable that the preconditioned positive electrode active material (coated positive electrode active material) also has an average particle diameter in the range prescribed above.

In usual, a preferable positive electrode active material has a BET specific surface area of suitably about 0.1 $m^2/g$ to 3.0 $m^2/g$, for instance, about 0.2 $m^2/g$ to 1.0 $m^2/g$. This BET specific surface area range can be preferably applied to a positive electrode active material prior to the preconditioning process. It is preferable that the preconditioned positive electrode active material also has a specific surface area in this range.

The positive electrode active material layer may comprise, as necessary, a conductive material, a binder, and so on.

As the conductive material, can be preferably used a conductive material powder such as carbon powder, carbon fibers, and so on. As the carbon powder, various species of carbon black such as acetylene black, furnace black, Ketjen black, graphite powder and the like are preferable. Among these conductive materials, can be used one species solely, or two or more species in combination.

As the binder, can be used one species solely, or two or more species in a suitable combination among polymer materials such as carboxymethyl cellulose (CMC; typically as a sodium salt), polyvinyl alcohol (PVA), polytetrafluoroethylene (PTFE), styrene-butadiene rubber (SBR), polyvinylidene fluoride (PVDF), and the like.

The amount of the positive electrode active material contained in the entire positive electrode active material layer is suitably about 50% by mass or greater (typically 50 to 95% by mass), and it is usually preferable to be about 70 to 95% by mass. When a conductive material is used, the amount of the conductive material contained in the entire positive electrode active material layer can be about 2 to 20% by mass, and it is usually preferable to be about 2 to 15% by mass. When a binder is used, the amount of the binder contained in the entire positive electrode active material layer can be about 0.5 to 10% by mass, and it is usually suitable to be about 1 to 5% by mass.

As the positive current collector, can be preferably used a conductive member formed of a metal having a good conductivity. For example, can be used aluminum or an alloy containing aluminum as the primary component. The shape of positive current collector 32 is not particularly limited as it may vary in accordance with the shape, etc., of the lithium-ion secondary battery, and it may have a variety of shapes such as a rod, plate, sheet, foil, mesh, and so on. In a lithium-ion secondary battery 100 comprising a wound electrode body 20 such as the present embodiment, an aluminum sheet (aluminum foil) having a thickness of about 10 microns to 30 microns can be preferably used as a positive current collector 32.

<Method for Producing Positive Electrode Sheet>

The non-aqueous secondary battery disclosed herein (lithium-ion secondary battery 100 shown in FIGS. 2,3 here) is characterized by being constructed with positive electrode sheet 30 comprising a positive electrode active material having coatings described later on surfaces thereof. The coatings may be SEI (solid electrolyte interface) films that function to suppress the activity of the positive electrode active material toward decomposition of electrolyte components. The coatings may have been formed via oxidative decomposition of a F-containing non-ionic compound (typically, comprising the decomposition products of the F-containing non-ionic compound). Positive electrode sheet 30 comprising such a coated positive electrode active material can be prepared, for instance, by a preconditioning process comprising the following steps: obtaining a positive electrode comprising an uncoated positive electrode active material (a positive electrode active material prior to coating formation); constructing a preconditioning cell with the positive electrode, a preconditioning negative electrode and a preconditioning electrolyte solution comprising a F-containing non-ionic compound; charging the preconditioning cell to allow the F-containing non-ionic compound to be decomposed at the positive electrode, thereby forming coatings on surfaces of the positive electrode active material. Lithium-ion secondary battery 100 can be constructed with the preconditioned positive electrode sheet 30 and a non-aqueous electrolyte solution different from the preconditioning electrolyte solution.

While referencing to the flow chart shown in FIG. 1, described below are preferable examples of the method for producing positive electrode sheet 30 and the method for producing a non-aqueous secondary battery (a lithium-ion secondary battery 100 having a construction shown in FIGS. 2 and 3 here) using the said positive electrode sheet. In the description below, a positive electrode active material before subjected to the preconditioning process may be referred to as an "pre-preconditioned positive electrode active material", and a positive electrode comprising an pre-preconditioned positive electrode active material may be referred to as an "pre-preconditioned positive electrode". A positive electrode active material that has been subjected to the preconditioning process may be referred to as a "preconditioned positive electrode active material" or a "coated positive electrode active material", and a positive electrode comprising such a positive electrode active material may be referred to as a "preconditioned positive electrode".

<Pre-Preconditioned Positive Electrode>

The pre-preconditioned positive electrode can be preferably fabricated by preparing a paste or slurry composition (a positive electrode active material layer-forming composition) as a dispersion in a suitable solvent of a positive electrode active material as described above, and a conductive material as well as a binder, etc., used as needed; followed by forming a positive electrode active material layer (a pre-preconditioned positive electrode active material layer) by applying the composition to a positive current collector sheet (e.g., an aluminum sheet) and allowing the composition to dry. As the solvent, can be used any of aqueous solvents and organic solvents. It is suitable that the amounts of the pre-preconditioned positive electrode active material, conductive material, and binder, etc., in the pre-preconditioned positive electrode active material layer are about the same as the amounts used in a positive electrode sheet of a lithium-ion secondary battery.

Drying of the composition applied to the positive current collector can be carried out with heating as necessary. The amount of the positive electrode active material provided per unit area of the positive current collector is suitably, for instance, about 5 $mg/cm^2$ to 40 $mg/cm^2$ (typically 5 $mg/cm^2$ to 20 $mg/cm^2$). In an embodiment where each face of the current collector is provided with a positive electrode active material layer, for instance, the combined amount of the two layers is suitably about 5 $mg/cm^2$ to 40 $mg/cm^2$ (typically 5 mg/cm² to 20 mg/cm²). In such an embodiment, it is usually preferable that the positive electrode active material layers provided on the respective faces of the positive current collector have about the same mass.

The composition applied to the positive current collector can be entirely pressed as necessary after dried. The positive electrode active material layer can have a density of, for instance, about 1.0 g/cm³ to 3.0 g/cm³ (typically 1.5 g/cm³ to 3.0 g/cm³).

<Preconditioning Negative Electrode>

The preconditioning negative electrode comprises a negative electrode active material capable of storing charge carriers (lithium ions here) released from the pre-preconditioned positive electrode active material by charging the preconditioning cell (step S122). As the negative electrode active material, can be used one species solely or a combination of suitable species among those listed later for a battery negative electrode.

In a preferable embodiment, the preconditioning negative electrode comprises a negative electrode active material capable of releasing lithium initially (upon construction of a preconditioning cell; step S110). Preferable examples of such a negative electrode active material include lithium metal. In the example shown in FIG. 1, a lithium metal in a sheet form is used as the preconditioning negative electrode. Preferable examples of a negative electrode active material capable of releasing lithium initially include lithium transition metal oxides such as lithium titanium oxide (e.g., $Li_4Ti_5O_{12}$) and the like. Thus, the preconditioning negative electrode may comprise, as the negative electrode active material, a lithium transition metal oxide such as lithium titanium oxide (e.g., $Li_4Ti_5O_{12}$) or the like. Such a lithium transition metal oxide can be used as a negative electrode active material layer, with it being mixed with a conductive material and a binder, etc., as necessary and typically being retained on a suitable negative current collector.

Usually, when surfaces of a positive electrode active material is provided with coatings by charging the preconditioning cell (step S122), lithium in the electrolyte is partially integrated in the coatings and the integrated lithium is fixed in the coatings, thereby becoming unavailable for battery reactions. The negative electrode active material capable of releasing lithium can be used to replace the lithium lost during the coating formation. This can prevent a deficiency in lithium to be stored in the positive electrode active material when discharging the preconditioning cell (step S124). When the negative electrode active material in a battery negative electrode does not contain any initially releasable lithium, it is especially meaningful to use a preconditioning negative electrode comprising a negative electrode active material capable of releasing lithium initially. Preferable examples of a negative electrode active material not containing any initially releasable lithium include particulate carbon materials (graphite particles, etc.) having a graphite structure at least partially.

The preconditioning negative electrode disclosed herein may comprise a negative electrode similar to those conventionally used in lithium-ion secondary batteries. Typical examples of such a negative electrode active material include carbon materials. A particulate carbon material (carbon particles) having a graphite structure (layered structure) at least partially can be used preferably. Any carbon material among so-called graphitic substances (graphites), hard-to-graphitize carbonaceous substances (hard carbons), easy-to-graphitize carbonaceous substances (soft carbons) and substances having a structure combining these can be preferably used. In particular, among these, graphite particles such as natural graphite, etc., can be preferably used. Carbon particles, etc., comprising non-crystalline (amorphous) carbon on surfaces of graphite particles can be used as well. Other examples of the negative electrode active material include metals such as tin (Sn), aluminum (Al), zinc (Zn), etc., as well as silicon (Si), and metallic materials (so-called alloy-based negative electrodes) consisting of alloys primarily comprising these elements, and like materials.

<Preconditioning Electrolyte Solution>

The preconditioning electrolyte solution comprises a lithium salt as a supporting salt (supporting electrolyte). As the supporting salt of the preconditioning electrolyte solution, can be used various lithium salts known to function as supporting electrolytes in lithium-ion secondary batteries, with examples including $LiPF_6$, $LiBF_4$, $LiClO_4$, $LiAsF_6$, $LiN(SO_2CF_3)_2$, $LiN(SO_2C_2F_5)_2$, $LiCF_3SO_3$, $LiC_4F_9SO_3$, $LiC(SO_2CF_3)_3$ and the like. Among these supporting salts, can be used one species solely, or two or more species in combination. As an especially preferable example, $LiPF_6$ is cited. It is preferable to prepare the preconditioning electrolyte solution to have a supporting salt concentration within a range of, for instance, 0.7 mol/L to 1.3 mol/L. A preferable preconditioning electrolyte solution is present as a liquid at room temperature (e.g., 25 degrees Celsius).

<F-Containing Non-Ionic Compound>

The preconditioning electrolyte solution comprises a F-containing non-ionic compound. The F-containing non-ionic compound may be, for instance, a fluorination product of a F-free non-ionic organic compound known to be usable for electrolyte solutions in lithium-ion secondary batteries. It can be a compound having a structure obtained by replacing one, two or more hydrogen atoms in the F-free non-ionic organic compound with fluorine atom(s). The F-free non-ionic organic compound can be various carbonates, ethers, esters, nitriles, sulfones, lactones, and so on. The carbonate encompasses cyclic carbonates and chain (acyclic) carbonates. The ether encompasses cyclic ethers and acyclic ethers. Among these F-containing non-ionic organic compounds, can be used one species solely, or two or more species in a suitable combination.

In usual, the fluorine content in the F-containing non-ionic compound is suitably 10% or greater, preferably 20% or greater, or more preferably 30% or greater (e.g., 40% or greater). Here, "the fluorine content" refers to the ratio of the number of F atoms contained in a F-containing non-ionic compound to the number of H atoms contained in the corresponding F-free non-ionic compound). Hereinafter, this may be referred to as a "F-substitution rate". The upper limit of the F-substitution rate is not particularly limited, and it can be 100% (i.e., a compound in which all H atoms are substituted with F atoms). From the standpoint of reducing the viscosity of the preconditioning electrolyte solution and increasing the ionic conductivity of it, can be preferably used a F-containing non-ionic compound having a F-substitution rate of 90% or lower (typically 80% or lower, e.g., 70% or lower).

It is desirable that the preconditioning electrolyte solution has an oxidation potential (vs. Li/Li⁺) equal to or higher than the operating potential (vs. Li/Li⁺) of the positive electrode active material. For example, a preferable electrolyte solution may have an oxidation potential higher than the operating potential (vs. Li/Li⁺) of the positive electrode active material by greater than 0 V (typically by about 0.1 V to 3.0 V, preferably by about 0.2 V to 2.0 V, e.g., by about 0.3 V to 1.0 V), by about 0 V to 0.3 V, or by 0.3 V or greater (typically by about 0.3 V to 3.0 V, preferably by about 0.3 V to 2.0 V, e.g., by about 0.3 V to 1.0 V).

The preconditioning electrolyte solution preferably comprises at least one species of F-containing non-ionic compound having an oxidation potential equal to or higher than the operating potential (vs. Li/Li$^+$) of the positive electrode active material. For example, such a F-containing non-ionic compound may have an oxidation potential higher than the operating potential (vs. Li/Li$^+$) of the positive electrode active material by greater than 0 V (typically by about 0.1 V to 3.0 V, preferably by about 0.2 V to 2.0 V, e.g., by about 0.3 V to 1.0 V), by about 0 V to 0.3 V, or by 0.3 V or greater (typically by about 0.3 V to 3.0 V, preferably by about 0.3 V to 2.0 V, e.g., by about 0.3 V to 1.0 V).

The preconditioning electrolyte solution preferably comprises such a F-containing non-ionic compound at 5% by mass or greater (e.g., 5 to 100% by mass) of all components in the preconditioning electrolyte solution excluding the supporting salt. In a preferable embodiment, this F-containing non-ionic compound is a component having the lowest oxidation potential among the components in the preconditioning electrolyte solution. A preconditioning electrolyte solution having such a composition is suitable for forming coatings on surfaces of the positive electrode active material by charging of the preconditioning cell.

Here, the oxidation potential (vs. Li/Li$^+$) of an electrolyte solution refers to a value measured by the following method.

A working electrode is fabricated with LiFePO$_4$. In particular, LiFePO$_4$, acetylene black (conductive material), and PVDF (binder) are mixed at a mass ratio of 85:5:10 and dispersed in N-methyl-2-pyrrolidone (NMP) to prepare a slurry composition. This is applied on top of an aluminum sheet, allowed to dry, and pressed by a roller to fabricate a working electrode (positive electrode) sheet. A three-electrode cell is constructed, using the working electrode, a lithium metal piece as a counter electrode, another lithium metal piece as a reference electrode, and an electrolyte solution to be measured. The three-electrode cell is subjected to a process to completely remove lithium from the working electrode. In particular, at a temperature of 25 degrees Celsius, the cell is charged up to 4.2 V at a constant current value that corresponds to one-fifth of the current value of the battery capacity (Ah) predicted from the theoretical capacity of the working electrode, and then charged at the same constant voltage of 4.2 V until the current value becomes one-fiftieth of the initial current value (i.e., current value equivalent to one-fiftieth of one-fifth of the battery capacity). Subsequently, in the voltage range (typically a voltage range above 4.2 V) where the oxidation potential of the electrolyte solution to be measured is included, charging at a certain constant voltage is carried out for a prescribed time period, and the current value is measured simultaneously. More specifically, the voltage is increased stepwise within the voltage range, and constant-voltage charging at each voltage is carried out for a prescribed time period (e.g., for about 10 hours), and the current value is measured simultaneously. The voltage at which the current value of greater than 0.1 mA is observed during the constant-voltage charging is recorded as the oxidation potential of the electrolyte solution.

The voltage can be increased, for instance, by 0.2 V increment. In the worked examples described later, the voltage was increased by 0.2 V increment. At the respective voltage levels, constant-voltage charging was carried out for 10 hours.

The reduction potential of an electrolyte solution, in turn, refers to a value measured by the following method.

A three-electrode cell is fabricated, using a glassy carbon piece as a working electrode, a lithium metal piece as a counter electrode, another lithium metal piece as a reference electrode. The three-electrode cell is subjected to a linear sweep voltammetry analysis. In particular, at a temperature of 20 degrees Celsius, the potential of the working electrode is swept from the open circuit voltage (OCV) upon the cell fabrication to 0.05 V. The sweep rate is set at 1 mV/s. From the resulting current (I) and potential (V) values, the differential values dI/dV are computed. The dI/dV values (Y-axis) are plotted against the potential V (X-axis) to obtain a graph. In this graph, the potential V corresponding to the first dI/dV peak appeared after the start of the analysis is recorded as the reduction potential (reductive decomposition potential). With respect to the embodiment of the worked examples described later, the OCV upon the cell fabrication was approximately 3 V.

<Fluorinated Carbonate>

In a preferable embodiment, the preconditioning electrolyte solution comprises one, two or more species of fluorinated carbonate (e.g., fluorination products of carbonates listed earlier) as the F-containing non-ionic compound. Any of fluorinated cyclic carbonates and fluorinated acyclic carbonates can be preferably used. It is usually preferable to use a fluorinated carbonate containing one carbonate group per molecule. The F-substitution ratio of such a fluorinated carbonate is usually suitable to be 10% or greater, or for instance, it can be 20% or greater (typically 20% or greater, but smaller than 100%, e.g., 20% or greater, but 80% or smaller). According to a preconditioning electrolyte solution comprising a fluorinated carbonate with a F-substitution ratio of 30% or greater (typically 30% or greater, but smaller than 100%, e.g., 30% or greater, but 70% or smaller), even greater results can be obtained.

<Fluorinated Cyclic Carbonate>

Preferable examples of the preconditioning electrolyte solution in the art disclosed herein include a preconditioning electrolyte solution comprising at least one species of fluorinated cyclic carbonate as the F-containing non-ionic compound. Of all components in the preconditioning electrolyte solution excluding the supporting salt (or "non-supporting salt components" hereinafter), the amount of the fluorinated cyclic carbonate can be, for instance, 5% by mass or greater, and it is usually suitable to be 10% by mass or greater, and preferable to be 20% by mass or greater (e.g., 30% by mass or greater). Essentially 100% by mass (typically 99% by mass or more) of the non-supporting salt components can be a fluorinated cyclic carbonate Usually, from the standpoint of reducing the viscosity of the preconditioning electrolyte solution and increasing the ionic conductivity of it, the amount of the fluorinated cyclic carbonate is suitably 90% by mass or less of the non-supporting salt components, or preferably 80% by mass or less (e.g., 70% by mass or less). When the preconditioning electrolyte solution comprises two or more species of fluorinated cyclic carbonate, the amount of the fluorinated cyclic carbonate refers to the total amount thereof.

A preferable fluorinated cyclic carbonate has 2 to 8 (more preferably 2 to 6, e.g., 2 to 4, typically 2 or 3) carbon atoms. With too many carbon atoms, the viscosity of the preconditioning electrolyte solution may increase, or the ionic conductivity may decrease. For instance, can be preferably used a fluorinated cyclic carbonate represented by the following formula (C1).

[Chem. 1]

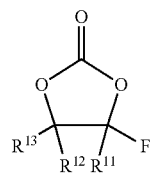
(C1)

In the formula (C1), each of $R^{11}$, $R^{12}$ and $R^{13}$ can be independently selected from a hydrogen atom, a fluorine atom, alkyl groups and haloalkyl groups having 1 to 4 (more preferably 1 or 2, typically 1) carbon atom(s), and other halogen atoms (preferably a chlorine atom) besides fluorine atom. The haloalkyl group may have a structure obtained by replacing one, two or more hydrogen atoms of the alkyl group with halogen atom(s) (e.g., fluorine atom(s) or chlorine atom(s), preferably fluorine atom(s)). In a preferable compound, one or two of $R^{11}$, $R^{12}$ and $R^{13}$ are fluorine atom(s). For instance, a compound with at least one of $R^{12}$ and $R^{13}$ being a fluorine atom is preferable. From the standpoint of decreasing the viscosity of the preconditioning electrolyte solution, can be preferably used a compound in which each of $R^{11}$, $R^{12}$ and $R^{13}$ is a fluorine atom or a hydrogen atom.

Specific examples of the fluorinated cyclic carbonate represented by the formula (C1) include mono-fluoroethylene carbonate (MFEC), difluoroethylene carbonate, 4,4-difluoroethylene carbonate, trifluoroethylene carbonate, perfluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate, and the like. As the difluoroethylene carbonate (DFEC), can be used either of trans-difluoroethylene carbonate (trans-DFEC) and cis-difluoroethylene carbonate (cis-DFEC). Use of trans-DFEC is usually more preferable. Since trans-DFEC is present as a liquid at room temperature (e.g., 25 degrees Celsius), it is advantageous in terms of the handling properties as compared to cic-DFEC which is present as a solid at room temperature.

For instance, can be preferably used a preconditioning electrolyte solution having a composition containing, as the F-containing non-ionic organic compound, at least trans-DFEC, at least MFEC, both trans-DFEC and MFEC, or the like. Such a F-containing cyclic carbonate (fluorinated ethylene carbonate) may form good coatings on surfaces of a positive electrode active material upon charging of the preconditioning cell (step S122). For example, it may form coatings that prevent oxidative decomposition to a greater extent. According to such a positive electrode active material having such a coating, can be constituted a lithium-ion secondary battery having even greater cycling properties. The positive electrode active material can be, for instance, a spinel lithium transition metal oxide ($LiNi_{0.5}Mn_{1.5}O_4$, etc.) represented by the general formula (A2) described earlier.

<Fluorinated Acyclic Carbonate>

The preconditioning electrolyte solution in the art disclosed herein can comprise, as the F-containing non-ionic compound, a fluorinated acyclic carbonate represented by the following formula (C2) in addition to or in place of the fluorinated cyclic carbonated described above.

[Chem.2]

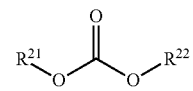
(C2)

At least one (preferably each) of $R^{21}$ and $R^{22}$ in the formula (C2) is a F-containing organic group, and it can be, for example, a fluorinated alkyl group or a fluorinated alkyl ether group. It can be a fluorinated alkyl group or a fluorinated alkyl ether group that has been further substituted with a halogen atom other than a fluorine atom. One of $R^{21}$ and $R^{22}$ may be an organic group (e.g., an alkyl group or an alkyl ether group) not containing a fluorine atom. Each of $R^{21}$ and $R^{22}$ is preferably an organic group having 1 to 6 (more preferably 1 to 4, e.g., 1 to 3, typically 1 or 2) carbon atoms. With too many carbon atoms, the viscosity of the preconditioning electrolyte solution may increase, or the ionic conductivity may decrease. For similar reasons, in usual, it is preferable that at least one of $R^{21}$ and $R^{22}$ is a straight chain, and it is more preferable that each of $R^{21}$ and $R^{22}$ is a straight chain. For instance, it is preferable to use a fluorinated acyclic carbonate in which each of $R^{21}$ and $R^{22}$ is a fluoroalkyl group with each containing a total of one or two carbon atom(s).

Specific examples of the fluorinated acyclic carbonate represented by the formula (C2) include fluoromethyl methyl carbonate, difluoromethyl methyl carbonate, trifluoromethyl methyl carbonate, fluoromethyl difluoromethyl carbonate, (or "TFDMC" hereinafter), bis(fluoromethyl) carbonate, bis(difluoromethyl) carbonate, bis(trifluoromethyl) carbonate, 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, ethyl 2-fluoroethyl carbonate, ethyl 2,2-difluoroethyl carbonate, bis(2-fluoroethyl) carbonate, ethyl 2,2,2-trifluoroethyl carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2',2'-difluoroethyl carbonate, bis(2,2,2-trifluoroethyl) carbonate, pentafluoroethyl methyl carbonate, pentafluoroethyl fluoromethyl carbonate, pentafluoroethyl ethyl carbonate, bis(pentafluoroethyl) carbonate, and the like.

In a preferable embodiment, the preconditioning electrolyte solution comprises, as the F-containing non-ionic compound, at least one species of fluorinated cyclic carbonate and at least one species of fluorinated acyclic carbonate. In a preconditioning electrolyte solution having such a composition, the fluorinated acyclic carbonate (preferably a fluorinated straight-chain carbonate) may contribute to allowing the electrolyte solution to be present as a liquid at room temperature (e.g., 25 degrees Celsius), or to decreasing the viscosity of the electrolyte solution.

The fluorinated cyclic carbonate and the fluorinated acyclic carbonate can be used at a volume ratio (cyclic to acyclic) in a range of, for instance, 5:95 to 95:5, and the ratio is usually suitable to be 10:90 to 90:10 and preferable to be 20:80 to 80:20 (more preferable to be 30:70 to 70:30). When the value of the volume ratio is too large or too small, in the preconditioning electrolyte solution, the fluorinated cyclic carbonate and the fluorinated acyclic carbonate may not form a uniform mixture.

A preferable fluorinated acyclic carbonate has an oxidation potential above that of a fluorinated cyclic carbonate to be used in combination. According to a preconditioning electrolyte solution having such a composition, when charging the preconditioning cell (step S122), the fluorinated cyclic carbonate is allowed to undergo oxidative decomposition preferentially, whereby surfaces of the positive electrode active material are provided with coatings of good quality. This statement is not intended to exclude partial oxidative decomposition (contribution to the coating formation on surfaces of the positive electrode active material) of the fluorinated acyclic carbonate during the charging process (step S122) in the art disclosed herein.

In addition to a supporting salt and a F-containing non-ionic compound, the preconditioning electrolyte solution may further comprise other components as necessary. For example, to decrease the viscosity of the preconditioning electrolyte solution, it may comprise a F-free non-ionic compound as described earlier. In usual, such a F-free non-ionic compound is used in an amount of preferably 20% by mass or less of non-supporting salt components contained in the electrolyte solution, or more preferably 10% by mass or less (e.g., 5% by mass or less). In usual, a preferable preconditioning electrolyte solution is essentially free of such a F-free non-ionic compound (e.g., with the F-free non-ionic compound content of zero or below 1% by mass).

<Construction of Preconditioning Cell>

A preconditioning cell is constructed by placing such a preconditioning electrolyte solution, a pre-preconditioned positive electrode described earlier, and a preconditioning negative electrode in a suitable buttery case (step S110). In FIG. 1, $LiNi_{0.5}Mn_{1.5}O_4$ is cited as an example of the pre-preconditioned positive electrode active material, and a lithium metal piece is cited as an example of the preconditioning negative electrode active material. As an example of the preconditioning electrolyte solution, is cited an electrolyte solution comprising $LiPF_6$ as a supporting salt in a mixed solvent (a mixed fluorinated solvent) formed of trans-DEFC and TFDMC. The volume ratio of trans-DEFC to TFDMC in the mixed solvent can be, for instance, about 1:1. The concentration of $LiPF_6$ can be, for instance, about 1 mol/L.

For constructing a preconditioning cell, can be used a separator to be placed between the pre-preconditioned positive electrode and the preconditioning negative electrode. As the separator, can be used a separator similar to those used in general non-aqueous secondary batteries (e.g., those used in lithium-ion secondary batteries) without particular limitations. For example, can be used a porous sheet or a non-woven fabric, etc., formed of a resin such as polyethylene (PE), polypropylene (PP), polyester, cellulose, polyamide, and the like. Preferable examples include a single-layer or a multi-layer porous sheet (micro-porous resin sheet) consisting essentially of one, two or more species of polyolefin resin. For example, can be preferably used a PE sheet, a PP sheet, a tri-layer (PP/PE/PP) sheet in which a PP layer is overlaid on each face of a PE layer, or the like. The thickness of the separator is preferably selected from a range of, for instance, about 10 microns to 40 microns.

<Charging of Preconditioning Cell>

Subsequently, the preconditioning cell is subjected to a preconditioning process (step S120). The preconditioning process comprises at least charging the preconditioning cell (step S122). The charging can be preferably carried out until the positive electrode potential (the upper potential limit or maximum potential) of the preconditioning cell reaches a level approximately equal (e.g., within plus minus 0.2 V, typically within plus minus 0.1 V) to or higher than the oxidation potential (vs. $Li/Li^+$) of at least one species of F-containing non-ionic compound contained in the preconditioning electrolyte solution. For example, the charging can be preferably carried out until the positive electrode potential (upper potential limit) of the preconditioning cell reaches a level higher by 0.05 V or more (preferably by 0.1 V or more) than the oxidation potential (vs. $Li/Li^+$) of at least one species of F-containing non-ionic compound contained in the preconditioning electrolyte solution. This allows the F-containing non-ionic compound (e.g., a fluorinated cyclic carbonate) to undergo decomposition (oxidative decomposition) at the positive electrode of the preconditioning cell, thereby allowing coatings comprising decomposition products thereof to be formed on surfaces of the positive electrode active material. Because the preconditioning electrolyte solution is usually present (thoroughly distributed) on the surface and the interior of the positive electrode active material layer in the preconditioning cell, upon decomposition of the F-containing non-ionic compound, coatings are formed on surfaces of the respective positive electrode active materials (typically particles) contained in each part of the positive electrode active material layer.

The F-containing non-ionic compound is preferably a component having the lowest oxidation potential among components accounting for 5% by mass or greater of the preconditioning electrolyte solution. The charging can be preferably carried out until the positive electrode potential (vs. $Li/Li^+$) reaches a level approximately equal (e.g., within plus minus 0.2 V, typically within plus minus 0.1 V) to or higher than the oxidation potential of the F-containing non-ionic compound. For example, the preconditioning cell is preferably charged until the positive electrode potential (vs. $Li/Li^+$) reaches a level higher by 0.05 V or more, preferably by 0.1 V or more, than the oxidation potential of the F-containing non-ionic compound. When the upper potential limit is too high, coatings may be formed less uniformly, or the coatings may tend to have a lower ability to prevent oxidative decomposition.

The upper potential limit (vs. $Li/Li^+$) of the positive electrode of the preconditioning cell during the charging process is suitably set at a level approximately equal (e.g., within plus minus 0.2 V, typically within plus minus 0.1 V) to or higher (e.g., by 0.05 V or more, preferably by 0.1 V or more) than the operating potential (vs. $Li/Li^+$) of the positive electrode active material contained in the positive electrode. The difference between the upper potential limit and the operating potential of the positive electrode active material is usually suitable to be 5 V or smaller and preferable to be 3 V or smaller (more preferable to be 2 V or smaller, e.g., 1 V or smaller). For instance, with respect to a preconditioning cell using $LiNi_{0.5}Mn_{1.5}O_4$ (operating potential 4.7 V (vs. $Li/Li^+$)) as the positive electrode active material, the charging can be carried out until the positive electrode potential (vs. $Li/Li^+$) reaches 4.8 V or above (typically 4.8 V to 6.0 V, e.g., 4.9 V to 5.5 V). When the upper potential limit is too low, the efficiency of the preconditioning process may tend to decline. When the upper potential limit is too high, the positive electrode active material may degrade, coatings may be formed less uniformly, or the coatings may tend to have a lower ability to prevent oxidative decomposition.

With respect to a preconditioning cell using lithium metal as the negative electrode active material, the upper potential limit (vs. Li/Li$^+$) of the positive electrode is approximately equal to the upper voltage limit (the upper limit of the voltage across the two electrodes) of the preconditioning cell.

In an embodiment using a preconditioning electrolyte solution comprising a fluorinated cyclic carbonate and a fluorinated acyclic carbonate having an oxidation potential higher than that of the fluorinated cyclic carbonate, the upper potential limit can be set at a level that is higher than the oxidation potential of the fluorinated cyclic carbonate, but lower than the oxidation potential of the fluorinated acyclic carbonate. By carrying out the preconditioning process at such an upper potential limit, surfaces of the positive electrode active material may be provided with coatings having higher uniformity as well as an excellent ability to prevent oxidative decomposition.

Charging of the preconditioning cell can be carried out by, for instance, a method (CC-charge method) where the cell is charged at a constant current (CC) rate until it reaches the upper voltage limit, or by a method (CC-CV charge method) where the cell is charged at a constant current rate up to the upper voltage limit and then charged at a constant voltage (CV). In usual, a CC-CV charge method can be preferably employed. The charge rate for CC-charging (which may be a CC-charging period during a CC-CV charging) is not particularly limited, and it can be, for instance, about 1/50 C to 5 C (1 C is a current rate that allows the battery to be fully charged in one hour). It is usually suitable that the charge rate is about 1/30 C to 2 C (e.g., 1/20 C to 1 C). When the charge rate is too low, the efficiency of the preconditioning process tends to decline. When the charge rate is too high, the positive electrode active material may degrade, coatings may be formed less uniformly, or the coatings may tend to have a lower ability to prevent oxidative decomposition.

It is suitable that the positive electrode of the preconditioning cell is maintained at the upper potential limit (vs. Li/Li$^+$) for a time period of, for instance, 180 minutes or less (i.e., more than zero minute, but 180 minutes or less), and this time period is usually suitable to be 15 minutes to 90 minutes. When this time period is too short, formation of coatings may be insufficient or less uniform, whereby the ability to prevent decomposition of the electrolyte solution may tend to decrease. When this time period is too long, depending on the conditions of the preconditioning process, coatings may be formed excessively, and a battery using the resulting coated positive electrode active material may have an increased internal resistance (e.g., an increased initial resistance), or the positive electrode active material may degrade.

<Discharging of the Preconditioning Cell>

In the production method according to a preferable embodiment, the preconditioning cell after charged in such a way (step S122) is allowed to discharge (step S124). The discharging allows the charged positive electrode active material (coated positive electrode active material) to store lithium ions, and in a lithium-ion secondary battery constituted with this positive electrode active material, the amount of lithium involved in charging and discharging can be suitably controlled. In addition, since the time in which the positive electrode of the charged preconditioning cell is maintained at the upper potential limit can be easily managed, the extent of the coating formation can be appropriately controlled. Furthermore, by avoiding a situation where the positive electrode of the preconditioning cell is maintained at the upper potential limit for too long a time, degradation of the positive electrode active material can be better prevented. It is also preferable to allow the preconditioning cell to discharge before removing the positive electrode (preconditioned positive electrode) from the preconditioning cell from the standpoint of the workability during removal of the positive electrode.

When a non-aqueous secondary battery (here a lithium-ion secondary battery) is constructed using, for instance, a negative electrode comprising a negative electrode active material capable of releasing lithium initially, the discharging process (step S124) can be omitted.

<Removal of Positive Electrode Sheet>

Subsequently, the preconditioned positive electrode (positive electrode comprising a coated positive electrode active material) is removed (taken out) from the preconditioning cell. Then, as shown in FIG. 3, using this positive electrode (positive electrode sheet) 30, a battery negative electrode (negative electrode sheet) 40 and a battery electrolyte solution 90, a lithium-ion secondary battery 100 is constructed (step S130 shown in FIG. 1).

<Battery Negative Electrode>

Negative electrode sheet 40 shown in FIG. 3 has a constitution where negative electrode active material layer 44 comprising a negative electrode active material is retained on a long sheet of negative current collector 42.

As the negative electrode active material, one, two or more kinds of material conventionally used in lithium-ion secondary batteries can be used without particular limitations. Preferable negative electrode active materials include carbon materials. A particulate carbon material (carbon particles) having a graphite structure (layered structure) at least partially can be used preferably. Any carbon material among so-called graphitic substances (graphites), hard-to-graphitize carbonaceous substances (hard carbons), easy-to-graphitize carbonaceous substances (soft carbons) and substances having a structure combining these can be preferably used. In particular, among these, graphite particles such as natural graphite, etc., can be preferably used. Carbon particles, etc., comprising non-crystalline (amorphous) carbon on surfaces of graphite particles can be used as well.

In FIG. 1, graphite is cited as an example of the negative electrode active material used in the battery. Other examples of the negative electrode active material include oxides such as lithium titanium oxide (e.g., $Li_4Ti_5O_{12}$, etc.; metals such as tin (Sn), aluminum (Al), zinc (Zn), etc., as well as silicon (Si), and metallic materials (so-called alloy-based negative electrodes) consisting of alloys primarily comprising these elements, and the like.

Although the amount of the negative electrode active material contained in the whole negative electrode material layer is not particularly limited, it is usually suitable to be about 50% by mass or greater and preferable to be about 90 to 99% by mass (e.g., about 95 to 99% by mass).

In order to produce a lithium-ion secondary battery with a higher upper voltage limit (with a higher buttery voltage), it is advantageous to use a negative electrode active material having a lower redox potential. For example, it is preferable to use a negative electrode active material having a redox potential (vs. Li/Li$^+$) of about 0.5 V or below, more preferably 0.2 V or below (e.g., 0.1 V or below). Can be preferably used graphite materials (e.g., graphite particles such as natural graphite, synthetic graphite, etc.) that can be at such a low potential, carbon materials obtainable by at least partially coating surfaces of these graphite materials with non-crystalline carbon, and like materials. In a lithium-ion secondary battery comprising a negative electrode that can be at such a low potential, the effects by the art disclosed herein can be produced to a greater extent. The present invention provides, for instance, a non-aqueous secondary battery (e.g., a lithium-ion secondary battery) having an operating voltage of 4.3 V or above (more preferably 4.5 V or above, or even 4.6 V or above, e.g., 4.7 V or above) while having excellent cycling properties.

As the binder, among those listed for the positive electrode, can be used one species solely, or two or more species in combination. The amount of the binder to be added can be suitably selected in accordance with the type and the amount of the negative electrode active material. For example, it can be 1 to 5% by mass of the entire negative electrode active material layer.

As the negative current collector 42 shown in FIG. 3, can be preferably used a conductive material formed of a metal having good conductivity. For instance, copper or an alloy containing copper as the primary component can be used. Similarly to positive current collector 32, negative current collector 42 may take a variety of shapes. In a lithium-ion secondary battery 100 comprising a wound electrode body 20 such as the present embodiment, a copper sheet (copper foil) having a thickness of about 5 microns to 30 microns can be preferably used as negative current collector 42.

Negative electrode sheet 40 can be preferably fabricated, for instance, by applying to negative current collector 42 a paste or slurry composition (negative electrode material layer-forming composition as a dispersion) obtained by dispersing in a suitable solvent a negative electrode active material along with a binder, etc., used as necessary followed by drying the composition. The drying process can be carried out with heating as needed. After dried, it can be entirely compressed as necessary. The mass (grammage) of negative electrode active material layer 44 is suitable to be, for example, about 3 mg/cm$^2$ to 30 mg/cm$^2$ (typically 3 mg/cm$^2$ to 15 mg/cm$^2$) (combined for the two faces) per unit area of negative current collector 42. It is usually preferable that negative electrode active material layers having approximately the same mass are provided on the respective faces of negative current collector 42. Negative electrode active material layer 44 can have a density of, for example, about 0.8 mg/cm$^2$ to 2.0 mg/cm$^2$ (typically 1.0 mg/cm$^2$ to 2.0 mg/cm$^2$).

<Capacity Ratio of Positive Electrode and Negative Electrode>

Although not particularly limited, the value of the ratio of the theoretical capacity of negative electrode ($C_N$) to the theoretical capacity of positive electrode ($C_P$), $C_N/C_P$, is, for instance, suitably 1.0 to 2.0, and preferably 1.2 to 1.9. When the $C_N/C_P$ value is too small, depending on conditions of battery use (e.g., rapid charging, etc.), there may occur disadvantages such as likely deposition of lithium metal, and so on. When the $C_N/C_P$ value is too large, the energy density of the battery may tend to decrease.

<Separator>

As separator 50 placed between positive electrode sheet 30 and negative electrode sheet 40 as shown in FIG. 3, can be used a separator similar to those generally used in the pertaining field without particular limitations. For example, can be used a porous sheet or a non-woven fabric formed of a resin such as PE, PP, polyester, cellulose, polyamide, or the like. Preferable examples include a single-layer or a multi-layer porous sheet (micro-porous resin sheet) consisting essentially of one, two or more species of polyolefin resin. For example, can be preferably used a PE sheet, a PP sheet, a tri-layer (PP/PE/PP) sheet in which a PP layer is overlaid on each face of a PE layer, or the like. The thickness of the separator is preferably selected from a range of, for instance, about 10 microns to 40 microns.

The separator in the art disclosed herein may have a constitution comprising a heat-resistant porous layer on one or each (typically one) face of the porous sheet, non-woven fabric, or the like. Such a heat-resistant porous layer may comprise, for instance, an inorganic material and a binder. As the inorganic material, can be preferably used inorganic fillers such as alumina powder, or the like.

<Battery Electrolyte Solution>

Non-aqueous electrolyte solution (battery electrolyte solution) 90 comprises a supporting salt in a non-aqueous solvent. As the supporting salt, a suitable salt can be selected and used among those generally used in lithium-ion secondary batteries. Examples of such a lithium salt include $LiPF_6$, $LiBF_4$, $LiClO_4$, $LiAsF_6$, $Li(CF_3SO_2)_2N$, $LiCF_3SO_3$ and the like. Among these supporting salts, can be used one species solely, or two or more species in combination. As an especially preferable supporting salt, $LiPF_6$ is cited. The non-aqueous electrolyte solution is preferably prepared to have a supporting salt concentration of 0.7 mol/L to 1.3 mol/L.

As the non-aqueous solvent, similarly to electrolyte solutions for general lithium-ion secondary batteries, can be used various carbonates, ethers, esters, nitriles, sulfones, lactones, and the like. The carbonate encompasses cyclic carbonates and acyclic carbonates. The ether encompasses cyclic ethers and acyclic ethers. Among these non-aqueous solvents (preferably F-free non-ionic compounds), can be used one species solely, or two or more species in a suitable combination.

Specific examples of a compound that can be used as the non-aqueous solvent include ethylene carbonate (EC), propylene carbonate (PC), diethyl carbonate (DEC), dimethyl carbonate (DMC), ethyl methyl carbonate (EMC), vinylene carbonate (VC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl-sulfoxide, sulfolane, gamma-butyrolactone, and the like. For example, a preferable non-aqueous solvent may have a composition containing one, two or more species of F-free carbonate in an amount greater than 50% by volume (more preferably 70% by volume or greater, or even more preferably 85% by volume or greater).

The F-containing non-ionic compound content (when two or more species are contained, their total content) in the battery electrolyte solution is preferably lower than 5% by mass, or more preferably lower than 3% by mass. In a preferable embodiment, the battery electrolyte solution is essentially free of a F-containing non-ionic compound (e.g., with its content being zero or below 1% by mass). Here, "being essentially free of a F-containing non-ionic compound" means containing no F-containing non-ionic compound that has been deliberately added at any rate. For instance, it does not mean to exclude the presence of a F-containing non-ionic compound residue carried in (mixed into the battery electrolyte solution) by the preconditioned positive electrode from the preconditioning electrolyte solution.

As described above, by using a preconditioning electrolyte solution comprising a F-containing non-ionic compound while using a battery electrolyte solution essentially free of (or containing a minute amount of) a F-containing non-ionic compound, advantages associated with use of a F-containing non-ionic compound can be brought out effectively. This is because a F-containing non-ionic compound tend to have higher oxidation resistance, but lower reduction resistance when compared to the corresponding F-free non-ionic compound.

<Analysis of Coatings>

The preconditioned positive electrode active material comprises coatings that contain decomposition products of a F-containing non-ionic compound. A non-aqueous secondary battery constituted with such a positive electrode active material (coated positive electrode active material) may have an evidently greater presence of fluorine atoms on surfaces of the positive electrode active material upon its construction (at its assembly) as compared to a non-aqueous secondary battery constructed with a conventional positive electrode active material (i.e., a positive electrode active material not preconditioned as described earlier). Such a difference in the presence of fluorine atoms can be carried on at least to some extent even after the non-aqueous secondary battery is put to use. In particular, in a non-aqueous secondary battery using a battery electrolyte solution with a low F-containing non-ionic compound content, the greater presence of fluorine atoms can be maintained to a greater extent. For example, in a non-aqueous secondary battery using a battery electrolyte solution that contains 3% by mass or less of, or is essentially free of a F-containing non-ionic compound, the greater presence of fluorine atoms can be maintained to an even greater extent.

Matters disclosed by the present description include a non-aqueous secondary battery (e.g., a lithium-ion secondary battery) constructed with a positive electrode comprising a positive electrode active material comprising on surfaces thereof coatings that comprises decomposition products of a F-containing non-ionic compound (i.e., a coated positive electrode active material), a negative electrode comprising substantially no such coatings, and a non-aqueous electrolyte solution. As the non-aqueous electrolyte solution, can be used a solution similar to those listed for the battery electrolyte solution. A non-aqueous electrolyte solution having a composition essentially free of a F-containing non-ionic compound is especially preferable. The coated positive electrode active material can be prepared via the preconditioning process. According to such an embodiment, the coatings can effectively suppress oxidative decomposition of electrolyte components at the positive electrode. In addition, since an uncoated negative electrode active material is used, the internal resistance (e.g., the initial resistance) of the battery can be suppressed to a lower level as compared to a battery where a coated negative electrode active material is used. This is preferable from the standpoint of the output properties.

The level of the presence of fluorine atoms on surfaces of an electrode active material may reflect on the level of the presence of fluorine atoms on surfaces of an electrode active material layer comprising the said electrode active material. The presence of fluorine atoms can be assessed, for instance, by subjecting the electrode active material surfaces (the positive electrode active material layer) to ion chromatography analysis, using a commercially available ion chromatography system. The battery electrolyte solution may comprise a fluorine compound (F-containing ionic compound) as a supporting salt. Thus, for analysis of electrode active material surfaces, a positive electrode active material (which may be present as a positive electrode sheet) removed from an non-aqueous secondary battery is preferably subjected to the surface analysis after washed and removed of the F-containing ionic compound. It can be suitably washed with an aprotic solvent (e.g., a solvent consisting of one, two or more species of carbonates).

<Power-Supply Unit>

Matters disclosed herein may include a method for using a non-aqueous secondary battery disclosed herein under charging/discharging conditions with the upper voltage limit being 4.3 V or above (typically 4.5 V or above, e.g., 4.7 V or above). Also included is a power-supply unit comprising such a lithium-ion secondary battery, and a control system (control unit) that controls the said battery under the charging/discharging conditions set to reach the upper voltage limit. The power-supply unit may comprise the lithium-ion secondary battery as in a battery unit comprising several batteries connected to each other in series or in parallel.

Figure 4:
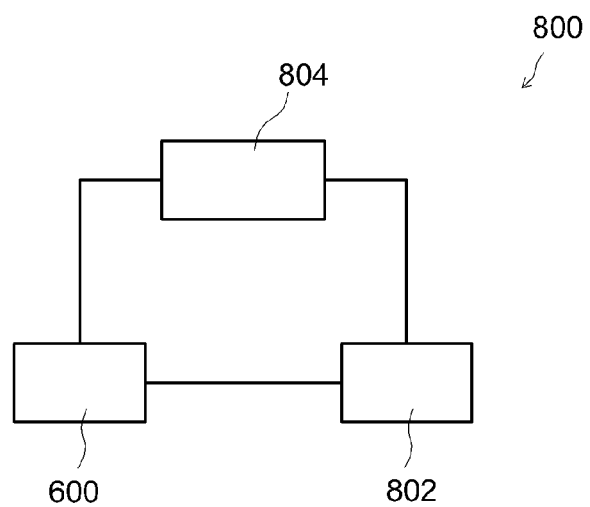
FIG. 4 shows a diagram illustrating a power-supply unit comprising a non-aqueous secondary battery according to an embodiment.
Figure 5:
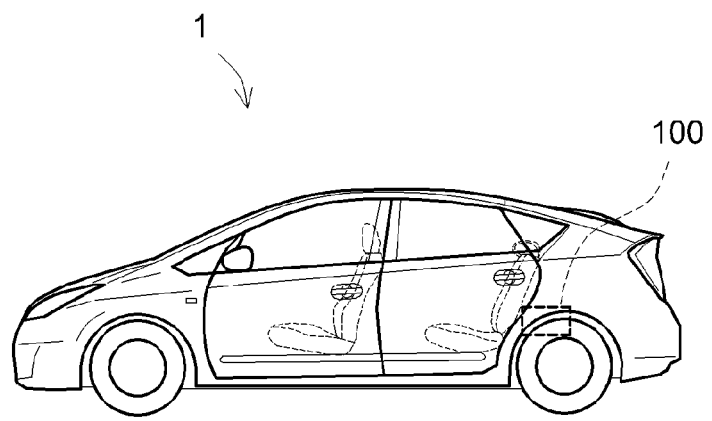
FIG. 5 shows a side view schematically illustrating a vehicle (automobile) comprising a non-aqueous secondary battery.

For instance, the power supply unit may have a constitution, as a power-supply unit 800 shown in FIG. 4, comprising lithium-ion secondary battery 600, load 802 connected thereto, electronic control unit (ECU) 804 that controls the operation of load 802 according to the state of lithium-ion secondary battery 600. Load 802 may comprise an electricity-consuming component that consumes the power stored in lithium-ion secondary battery 600 and/or an electricity-supplying component (a charger) capable of charging battery 600. Based on prescribed data, ECU 804 controls load 802 so that the upper voltage limit of battery 600 is at a prescribed level (e.g., 4.5 V) equal to or above 4.3 V. A typical constitution of ECU 804 may comprise a ROM (read only memory) storing a program for such battery control and a CPU (central processing unit) capable of executing the program. As the prescribed data, can be used one, two or more data among the voltage of battery 600, the potential of one or each electrode (e.g., positive electrode), the charge/discharge history, and other data. Lithium-ion secondary battery 100 disclosed herein can be loaded on vehicle 1 as shown in FIG. 5 as a component of power-supply unit 800 as shown in FIG. 4. Vehicle 1 is typically an automobile, and in particular, it can be an automobile comprising an electric motor, such as a hybrid automobile, an electric automobile, and a fuel cell automobile.

Several worked examples relating to the present invention are described below, but the present invention is not intended to be limited to these examples. In the description below, "parts" and "%" are based on the mass unless otherwise specified.

The respective electrolyte solutions used in the experiments below are described next.

<Non-Aqueous Electrolyte Solutions>

(Electrolyte Solution A)

In a mixed solvent containing trans-DFEC as a cyclic carbonate and TFDMC (i.e., fluoromethyldifluoromethylcarbonate represented by $FH_2CO(C\!=\!O)OCHF_2$) as an acyclic carbonate at a volume ratio of 1:1, $LiPF_6$ was dissolved to a concentration of 1 mol/L to prepare a non-aqueous electrolyte solution A.

The electrolyte solution A had an oxidation potential of 5.0 V to 5.2 V and a reduction potential of 2.4 V when measured according to the method described earlier.

(Electrolyte Solution B)

In a mixed solvent containing MFEC and TFDMC ($FH_2CO(C\!=\!O)OCHF_2$) at a volume ratio of 1:1, $LiPF_6$ was dissolved to a concentration of 1 mol/L to prepare a non-aqueous electrolyte solution B.

The electrolyte solution B had an oxidation potential of 4.9 V to 5.1 V and a reduction potential of 1.9 V when measured according to the method described earlier.

(Electrolyte Solution C)

In a mixed solvent containing EC and DMC at a volume ratio of 1:1, $LiPF_6$ was dissolved to a concentration of 1 mol/L to prepare a non-aqueous electrolyte solution C.

The electrolyte solution C had an oxidation potential of 4.6 V to 4.8 V and a reduction potential of 1.5 V when measured according to the method described earlier.

TABLE 1

| Electrolyte solution | Concentration of $LiPF_6$ | Solvent Cyclic carbonate | Acrylic carbonate | Volume Ratio |
|---|---|---|---|---|
| A | 1.0 mol/L | 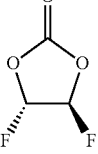 | 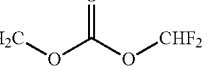 | 1:1 |
| B | 1.0 mol/L | 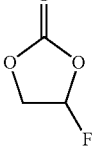 | 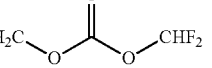 | 1:1 |
| C | 1.0 mol/L | 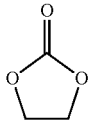 | 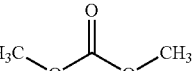 | 1:1 |

Example 1

Fabrication of Positive Electrode Sheet

As a positive electrode active material, was obtained $LiNi_{0.5}Mn_{1.5}O_4$ having an average particle diameter $D_{50}$ of 6 microns and a BET specific surface area of 0.7 $m^2/g$. This positive electrode active material, acetylene black (conductive material) and PVDF (binder) were dispersed at a mass ratio of 87:10:3 in NMP to prepare a slurry composition. The composition was applied to one face of a long aluminum sheet (positive current collector) of 15 microns thickness and allowed to dry to form a positive electrode active material layer. The current collector with the positive electrode active material layer was pressed by a roller to adjust the density of the positive electrode active material layer to 2.3 $g/cm^3$, whereby a positive electrode sheet having a theoretical capacity (designed capacity) Cp of 60 mAh was obtained.

(Construction of Preconditioning Cell)

The positive electrode sheet, a separator (PP/PE/PP tri-layer porous sheet) impregnated with the electrolyte solution A (a non-aqueous 1 mol/L $LiPF_6$ solution in trans-DEFC/TFDMC at 1:1 by volume), and a lithium metal sheet as a preconditioning negative electrode were overlaid in this order. This layered body was covered with a laminate film in a suitable size, and the perimeter was sealed leaving a small opening. From the opening, the electrolyte solution A was further injected, and the opening was sealed to construct a preconditioning cell. The preconditioning cell was equipped with a positive terminal and a negative terminal that were connected to the positive electrode sheet and the preconditioning negative electrode, respectively, and were extended to the outside of the laminate film.

(Preconditioning)

The preconditioning cell was charged at a constant current (CC) rate of 1/10 C until the positive electrode potential reached 4.9 V (the upper potential limit) and then charged at the same constant voltage (CV) until the current rate became 1/50 C, whereby the cell was fully charged. After a lapse of 10 minutes from the charge completion, the conditioning cell was allowed to discharge at a constant current rate of 1/10 C until the positive electrode potential reached 3.5 V followed by discharging at the same constant voltage until the current rate became 1/50 C. After the preconditioning process, the preconditioning cell was disassembled, and the positive electrode sheet (preconditioned positive electrode sheet) was recovered solely.

(Fabrication of Negative Electrode Sheet)

As a negative electrode active material, was obtained a natural graphite-based material having an average particle diameter $D_{50}$ of 20 microns, a crystal lattice constant ($C_0$) of 0.67 nm and a c-axis length ($L_c$) of 27 nm. This negative electrode active material, CMC (thickener) and SBR (binder) were mixed at a mass ratio of 98:1:1 in ion-exchanged water to prepare a slurry composition. The composition was applied to one face of a 10 microns thick copper sheet (negative current collector) and allowed to dry to form a negative electrode active material layer. The current collector with the negative electrode active material layer was pressed by a roller to adjust the density of the negative electrode active material layer to 1.4 $g/cm^3$, and the resultant was cut into a rectangle of the same dimensions as the positive electrode sheet to obtain a negative electrode sheet. The applied amount of the composition was adjusted so that the negative and the positive electrodes had a theoretical capacity ratio ($C_N/C_P$) value of 1.5.

(Construction of Non-Aqueous Secondary Battery)

The preconditioned positive electrode sheet (the positive electrode sheet recovered from the discharged preconditioning cell was used without any washing in particular; the same applies hereinafter), a separator (PP/PE/PP tri-layer porous sheet) impregnated with the electrolyte solution C, and the negative electrode sheet were overlaid in this order. This layered body was covered with a laminate film in a suitable size, and the perimeter was sealed leaving a small opening. From the opening, the electrolyte solution C was further injected, and the opening was sealed to construct a non-aqueous secondary battery (lithium-ion secondary battery) according to the present example. The battery was equipped with a positive terminal and a negative terminal that were connected to the positive electrode sheet and the negative electrode sheet, respectively, and were extended to the outside of the laminate film. In a battery having such a construction, the voltage (across the two electrodes) of the battery is approximately equal to the positive electrode potential (vs. $Li/Li^+$).

Example 2

The upper potential limit was set at 5.3 V instead of 4.9 V in the preconditioning process in Example 1. Otherwise in the same manner as Example 1, a lithium-ion secondary battery according to the present example was constructed.

Example 3

The electrolyte solution B was used for constructing a preconditioning cell in place of the electrolyte solution A in Example 1. Otherwise in the same manner as Example 1, a lithium-ion secondary battery according to the present example was constructed.

Example 4

In the present example, a lithium-ion secondary battery was constructed with the positive electrode sheet prior to preconditioning, the negative electrode sheet and the electrolyte solution C.

Example 5

In the same manner as Example 4 except that the electrolyte solution A was used in place of the electrolyte solution C, a lithium-ion secondary battery according to the present example was constructed.

Example 6

In the same manner as Example 4 except that the electrolyte solution B was used in place of the electrolyte solution C, a lithium-ion secondary battery according to the present example was constructed.

<Conditioning>

The battery according to each example was subjected to three cycles of CC-charging at a rate of ⅓ C until the potential difference (voltage) across the two electrodes reached 4.9 V and CC-discharging at a rate of ⅓ C to a voltage across the two electrodes of 3.5 V.

<Evaluation of Properties>

(Initial Capacity)

At a temperature of 25 degrees Celsius, the battery was CC-charged at a rate of ⅕ C up to a voltage across the two electrodes of 4.9 V and then CV-charged until the current rate became 1/50 C, whereby it was fully charged. Subsequently, while the battery was allowed to CC-discharge at a rate of ⅕ C to a voltage across the two electrodes of 3.5 V, the discharge capacity was measured as the initial capacity (initial discharge capacity).

(Cycle Test)

After the measurement of the initial capacity, each battery adjusted to 60% SOC at a rate of ⅕ C at a temperature of 25 degrees Celsius was subjected, at a temperature of 40 degrees Celsius, to 400 runs of the following (1) to (4) charge/discharge cycle:

(1) CC-charge at a 2 C rate up to 4.9 V
(2) 10 min break
(3) CC-discharge at a 2 C rate down to 3.5 V
(4) 10 min break.

After the 400th cycle, the discharge capacity was measured in the same manner as the initial capacity measurement. The percentage of the discharge capacity after the 400th cycle relative to the initial discharge capacity was determined as the capacity retention rate (%).

TABLE 2

| Example | Preconditioning cell | | Lithium-ion secondary battery | Initial discharge capacity | Cycling properties (after 400 cycles) | |
|---|---|---|---|---|---|---|
| | Electrolyte solution | Upper voltage limit | Electrolyte solution | | Discharge capacity | Capacity retention rate |
| 1 | A | 4.9 V | C | 60 mAh | 42 mAh | 70% |
| 2 | A | 5.3 V | C | 58 mAh | 46 mAh | 79% |
| 3 | B | 4.9 V | C | 61 mAh | 36 mAh | 59% |
| 4 | — | — | C | 60 mAh | 23 mAh | 38% |
| 5 | — | — | A | 57 mAh | 26 mAh | 45% |
| 6 | — | — | B | 58 mAh | 24 mAh | 41% |

As shown in Table 2, lithium-ion secondary batteries of Examples 1 to 3 using the preconditioned positive electrode sheet (comprising a coated positive electrode active material) preconditioned with either the electrolyte solution A or B as a preconditioning electrode solution had initial capacities comparative to the lithium-ion secondary battery of Example 4 using the positive electrode sheet pre-preconditioned (prior to preconditioning) while their capacity retention rates were increased by 1.5-fold or more (1.8-fold or more in Examples 1 and 2). The increases in the capacity retention rate may have resulted from significant suppression of oxidative decomposition of the electrolyte solution C. In comparison between Examples 1 and 3 where the upper potential limits during the preconditioning process were the same, even greater effects were obtained in Example 1 using the electrolyte solution A that contained trans-DFEC as a fluorinated cyclic carbonate than in Example 3 using the electrolyte solution B that contained MFEC. In comparison between Examples 1 and 2 both using the same electrolyte solution A, a higher capacity retention rate was attained in Example 2 where the upper potential limit during the preconditioning process was higher.

With respect to Examples 5 and 6 using the electrolyte solutions A and B as buttery electrode solutions, respectively, with each containing a F-containing non-ionic compound, their capacity retention rates were somewhat higher than that of Example 4, but their cycling properties were clearly inferior to those of Examples 1 to 3. These results can be understood as follows. That is to say, it is presumed that since the electrolyte solutions A and B had higher oxidation resistance (higher oxidation potentials) as compared to the electrolyte solution C, in the batteries according to Examples 5 and 6, decomposition of the electrolyte solutions were suppressed at their positive electrodes to greater extents as compared to the battery according to Example 4. However, it is presumed that since the electrolyte solutions A and B had lower reduction resistance (higher reduction potentials) as compared to the electrolyte solution C, in the batteries according to Examples 5 and 6, decomposition of the electrolyte solutions progressed at their negative electrodes as compared to the battery according to Example 4. The progressed decomposition of electrolyte solution at the negative electrodes partially is considered to have canceled part of the effects at the positive electrode to suppress decomposition of the electrolyte solution.

(Initial Resistance)

The lithium-ion secondary batteries according to Examples 3 and 4 were subjected to the following test. In particular, at a temperature of 25 degrees Celsius, each battery cell after the initial capacity measurement was CC-charged at a rate of ⅕ C to 60% SOC. Each battery cell adjusted to 60% SOC was CC-charged and CC-discharged at rates of ⅓ C, 1 C and 3 C, and the overvoltage was detected at the same time. The detected overvoltage values were divided by the corresponding current values (e.g., 20 mA for ⅓ C) to determine the resistances, and the average value thereof was recorded as the initial resistance.

As a result, while the lithium-ion secondary battery according to Example 4 had an initial resistance of 1.5 ohm, the lithium-ion secondary battery according to Example 3 using the positive electrode sheet (coated positive electrode active material) preconditioned with the preconditioning electrolyte solution B had an initial resistance of 1.6 ohm, which was approximately equal to that of the lithium-ion secondary battery according to Example 4. This result indicates that with a preconditioned positive electrode, it may be possible to keep the initial resistance at a low level while significantly increasing the cycling properties (e.g., increasing the capacity retention rate by 1.5-fold or more).

<Analysis of Coatings>

The lithium-ion secondary batteries according to Examples 1, 3 and 4 were disassembled after the cycle test (after 400 cycles), and the respective positive electrode sheets were recovered and washed with EMC. In particular, a first, second and third containers were filled with EMC, respectively. The positive electrode sheet (in which the battery electrolyte solution was present) recovered from each battery was immersed under EMC in the first container for 5 minutes, and then removed (recovered) from the EMC bath. The same procedure was repeated in the second and third EMC baths.

With respect to the washed positive electrode sheets according to Examples 1, 3 and 4, the surfaces of their respective positive electrode active material layers were analyzed with an ion chromatography system under model number "ICS-3000" available from Nippon Dionex K. K. The results converted to values per unit volume of the positive electrode active material are shown in Table 3.

TABLE 3

| Example | Presence ($\mu mol/cm^3$) | | | | | | Total amount of F atoms ($\mu mol$) |
|---|---|---|---|---|---|---|---|
| | $F^-$ | $PO_2F_2^-$ | $PF_6^-$ | $PO_4^{3-}$ | $PO_3F^{2-}$ | $CO_3^{2-}$ | |
| 1 | 807.7 | 96.2 | 38.5 | — | — | 23.1 | 1231.1 |
| 3 | 173.1 | 46.2 | — | — | — | — | 265.5 |
| 4 | 38.5 | 23.1 | — | — | — | — | 84.7 |

(The sign "—" indicates that it was below the detection limit.)

As shown in Table 3, after the batteries were put to use, significant differences were observed in the presence of fluorine atoms on the surfaces of positive electrode active material layers among the lithium-ion secondary batteries (Examples 1, 3) constructed with coated positive electrode active materials formed via the preconditioning process carried out in an electrolyte solution containing a F-containing non-ionic compound and the lithium-ion secondary battery (Example 4) constituted with an uncoated positive electrode active material. The small presence of fluorine atoms detected in Example 4 may have been a result of decomposition of some supporting salt ($LiPF_6$) at the positive electrode.

Although specific embodiments of the present invention have been described in detail above, these are merely for illustrations, and the art disclosed herein includes various modifications and changes made to the specific embodiments illustrated above.

REFERENCE SIGNS LIST 1 vehicle
10 battery case
20 wound electrode body
30 positive electrode sheet (positive electrode)
32 positive current collector
34 positive electrode active material layer
40 negative electrode sheet (negative electrode)
42 negative current collector
44 negative electrode active material layer
50 separator
90 non-aqueous electrolyte solution (battery electrolyte solution)
100, 600 lithium-ion secondary battery (non-aqueous secondary battery)
800 power-supply unit

The invention claimed is:

1. A method for producing a non-aqueous secondary battery comprising:
constructing a preconditioning cell that comprises a positive electrode comprising a positive electrode active material, a preconditioning electrolyte solution comprising a supporting salt and a fluorine containing non-ionic compound, and a preconditioning negative electrode;
carrying out a preconditioning process by charging the preconditioning cell and allowing the fluorine-containing non-ionic compound to be decomposed at the positive electrode to form coatings on surfaces of the positive electrode active material; and
constructing a non-aqueous secondary battery, using the positive electrode active material having the coatings formed, a non-aqueous electrolyte solution different from the preconditioning electrolyte solution, and a negative electrode comprising a negative electrode active material.

2. The method according to claim 1 wherein the preconditioning electrolyte solution comprises a fluorine-containing carbonate as the fluorine-containing non-ionic compound.

3. The method according to claim 1 wherein the preconditioning electrolyte solution comprises a fluorine-containing cyclic carbonate as the fluorine-containing non-ionic compound.

4. The method according to claim 1 wherein the preconditioning electrolyte solution comprises at least one of transdifluoroethylene carbonate and mono-fluoroethylene carbonate as the fluorine-containing non-ionic compound.

5. The method according to claim 1 wherein the nonaqueous electrolyte solution used for constructing the non-aqueous secondary battery comprises a supporting salt and a non-aqueous solvent, with the non-aqueous solvent consisting essentially of a fluorine-free non-ionic compound.

6. The method according to claim 1 wherein, in the preconditioning process, the fluorine-containing non-ionic compound is allowed to be decomposed with the positive electrode being at a potential above 4.3 V versus lithium metal.

7. The method according to claim 1 wherein the battery is the non-aqueous secondary battery in which the positive electrode operates at a potential above 4.3 V versus lithium metal.

8. The method according to claim 1 wherein the positive electrode active material comprises a spinel lithium nickel manganese oxide.

9. A non-aqueous secondary battery produced by the method according to claim 1.

10. A power-supply unit comprising
a non-aqueous secondary battery according to claim 9, and
a control circuit that is electrically connected to the battery and controls at least the upper voltage limit of the battery, wherein
the upper voltage limit is set at a level that allows the positive electrode of the battery to reach a potential above 4.3 V versus lithium metal.

* * * * *